United States Patent [19]

Bretagne

[11] Patent Number: 5,262,120
[45] Date of Patent: Nov. 16, 1993

[54] METHOD OF MANUFACTURING A PROTECTIVE SHEATH

[75] Inventor: Joël Bretagne, Saint Nazaire, France

[73] Assignee: Societe Anonyme dite: Aerospatiale Societe Nationale Industrielle, France

[21] Appl. No.: 901,511

[22] Filed: Jun. 19, 1992

[30] Foreign Application Priority Data

Jun. 19, 1991 [FR] France .................. 91 07544

[51] Int. Cl.$^5$ .................. B29C 43/02; B29C 67/14
[52] U.S. Cl. .................. 264/571; 138/162; 138/167; 264/257; 264/318; 264/573
[58] Field of Search .................. 264/219, 257, 297.4, 264/297.5, 512, 571, 573, 318; 138/110, 149, 157, 162, 163, 167, 168

[56] References Cited

U.S. PATENT DOCUMENTS

| | | | |
|---|---|---|---|
| 136,755 | 3/1873 | Palmer | 138/163 |
| 3,055,399 | 9/1962 | Bush et al. | 138/167 |
| 3,425,456 | 2/1969 | Schibig | 138/162 |
| 3,461,945 | 8/1969 | Trimble et al. | 264/318 |
| 4,008,100 | 2/1977 | Sundberg et al. | 264/257 |
| 4,260,181 | 4/1981 | Curtin | 138/168 |

FOREIGN PATENT DOCUMENTS

| | | |
|---|---|---|
| 3810356 | 7/1989 | Fed. Rep. of Germany . |
| 1589475 | 5/1981 | United Kingdom .......... 138/162 |
| 2186338 | 8/1987 | United Kingdom . |

Primary Examiner—Jay H. Woo
Assistant Examiner—Robert B. Davis
Attorney, Agent, or Firm—Marshall, O'Toole, Gerstein, Murray & Borun

[57] ABSTRACT

A method of manufacturing a protective sheath made of laminated material based on fibers impregnated with resin, the method making use of a cylindrical draping mandrel, wherein:
  at least two longitudinal elements are provided on the mandrel to project from the periphery thereof, which elements are disposed substantially along diametrically opposite generator lines of the mandrel, dividing the mandrel into two longitudinal semicylindrical portions;
  a first sheet of flexible laminated material is placed on one of the semicylindrical portions of the mandrel, with the longitudinal margins of the sheet overlying the longitudinal elements;
  a second sheet of flexible laminated material is placed on the other semicylindrical portion, with the longitudinal margins thereof overlying the longitudinal margins of the first sheet and the projecting longitudinal elements;
  the first and second sheets are pressed against the outside surfaces of the semicylindrical portions by means of a pressure difference;
  both sheets are hardened, thereby defining two semicylindrical half-shells which are interfitted in each other along their respective longitudinal margins, which margins fit over the profile of the elements and form external longitudinal swellings; and
  the two half-shells are removed from the mandrel.

9 Claims, 3 Drawing Sheets

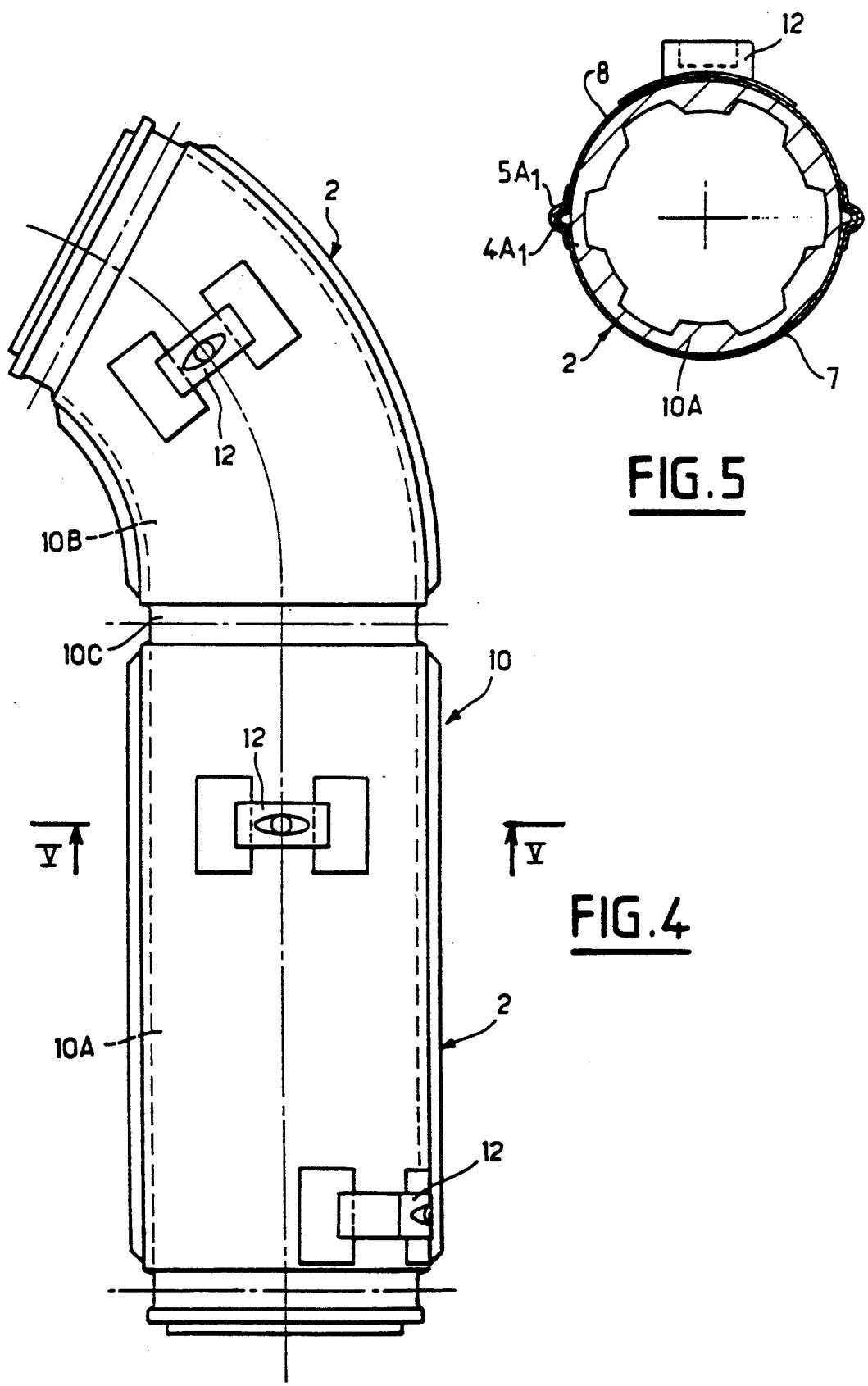

METHOD OF MANUFACTURING A PROTECTIVE SHEATH

The present invention relates to a method of manufacturing a protective sheath made of a laminated material based on fibers impregnated with resin, and also to a sheath obtained by implementing said method.

BACKGROUND OF THE INVENTION

More particularly, but not exclusively, the protective sheath is intended in its preferred application for protecting fluid ducts, e.g. high temperature air-conditioning ducts. However, it is obvious that a sheath made in accordance with the invention can be installed around any other type of duct such as ducting for water or for compressed air, or even around electrical cables and/or optical cables, assuming that it is thought necessary to protect them.

In said preferred application, and in conventional manner, ducts are initially surrounded by a sleeve, generally made of glass wool lagging that provides thermal insulation for the duct. The sleeve is then surrounded by said sheath which is made of laminated material for the purpose of protecting the duct from the outside and, in the event of a leak from the duct, for the purpose of preventing the fluid that flows at high temperatures escaping to the outside. The sheath is then normally made of glass or synthetic fibers impregnated with a suitable resin. Thus, to improve the characteristics of such protective sheaths, and in particular the stiffness thereof, it is becoming more and more common to use carbon fibers.

Such conventional sheaths are made by means of a cylindrical draping mandrel whose outside geometrical shape, e.g. rectilinear shape, curved shape, or bent shape, corresponds to the shape of the sheath to be obtained, i.e. to the shape of the duct to be covered while making allowance, in the above-mentioned application, for the insulating sleeve. To do this, a sheet of laminated material (fiber-resin) is put into place around the mandrel with one of the longitudinal margins of the sheet extending parallel to the mandrel overlapping its other longitudinal margin such that the two margins overlap over a given angular arc. The sheet wound in this way against the outside surface of the mandrel is then pressed and subsequently hardened by polymerization in order to obtain the protective sheath. Thereafter the sheath is withdrawn from the mandrel and is put into place around the duct to be protected coated with its insulating sleeve, by moving apart the two longitudinal margins of the sheath taking advantage of its intrinsic resilience so as to enable the sheath to pass around the sleeve, after which the longitudinal margins return spontaneously to their initial position where they overlap.

Although removing protective sheaths from said mandrels and, a fortiori, installing them on ducts takes place without difficulty providing the outside geometrical shapes of the ducts to be protected are rectilinear or only slightly curved, when said ducts are bent or have a sinuous outside shapes, removing the resulting sheaths from said mandrels can be difficult because of the separation that needs to be imparted to the longitudinal margins thereof, since this can give rise to major deformation of the sheath and may even exceed its elastic limit.

In addition, removing sheaths when made of carbon fibers is made even more difficult because of the greater stiffness of such sheaths which are then less resilient and therefore more fragile. Consequently, a high proportion of sheaths need to be rejected on being removed from the mandrels because cracking frequently arises that may even amount to breakage of the sheaths, and this is expensive.

It thus appears that the manufacture of protective sheaths made of fibers, and in particular carbon fibers, together with resin is particularly difficult if not impossible when the outside geometrical shape of a duct is complex.

Furthermore, locating a possible leak of fluid that may appear in a duct can be difficult because the sealing of the protective sheath obtained by resilient contact between its two longitudinal margins is poor. Under such circumstances, the fluid passes through the insulating sleeve and spreads all around the protective sheath, escaping via its longitudinal margins.

Furthermore, in the specific application to a duct surrounded by an insulating sleeve of glass wool, it often happens that when the protective sheath is put into place, the sharp edges of the longitudinal margins damage the sleeve.

An object of the present invention is to remedy these drawbacks and to provide a method of manufacturing a protective sheath whereby removal of the sheath from said mandrel and subsequent mounting thereof around a duct can be performed without difficulty and independently of the geometrical shape of the fluid-flow duct.

SUMMARY OF THE INVENTION

To this end, the present invention provides a method of manufacturing a protective sheath made of laminated material based on fibers impregnated with resin, the method making use of a cylindrical draping mandrel and being remarkable in that:
- at least two longitudinal elements are provided on said mandrel to project from the periphery thereof, which elements are disposed substantially along diametrically opposite generator lines of the mandrel, dividing said mandrel into two longitudinal semicylindrical portions;
- a first sheet of flexible laminated material is placed on one of said semicylindrical portions of the mandrel, with the longitudinal margins of the sheet overlying said longitudinal elements;
- a second sheet of flexible laminated material is placed on the other semicylindrical portion, with the longitudinal margins thereof overlying the longitudinal margins of the first sheet and said projecting longitudinal elements;
- the first and second sheets are pressed against the outside surfaces of the semicylindrical portions by means of a pressure difference,
- both sheets are hardened, thereby defining two semicylindrical half-shells which are interfitted in each other along their respective longitudinal margins, which margins fit over the profile of said elements and form external longitudinal swellings; and
- the two half-shells are removed from said mandrel.

Thus, by implementing the method and by virtue of the two elements provided on the draping mandrel, a protective sheath is obtained that is made up of two semicylindrical half-shells of laminated material, in particular based on carbon fibers, which are removably interfitted one within the other via corresponding overlapping margins that form the longitudinal swellings.

Protective sheaths can then be made of complex geometrical configurations. Regardless of the shape of the draping mandrel, which shape corresponds to the shape of the duct, removing the sheath made on the mandrel does not give rise to any difficulty since the longitudinal margins of the outer half-shell that is made by the second sheet are then moved apart only a little, thereby disengaging the longitudinal swellings of the inner half-shell made by the first sheet. Thereafter, installing the sheath around the duct to be protected, optionally covered with an insulating sleeve, is performed easily by placing the two half-shells on opposite sides of the duct, and then in moving them towards each other until their longitudinal margins overlap and then interfit because of the swellings.

Assembling half-shells together by interfitting swellings thus guarantees that the sheath is installed quickly and reliably, and also guarantees good sealing along the duct.

Consequently, the method of the invention serves not only to make sheaths having a variety of geometrical shapes, but also to avoid such sheaths being rejected, to enable carbon fibers impregnated with resin to be used as the laminated material, and thus to improve the stiffness of the sheaths, to obtain good sealing between pairs of half-shells, thereby improving detection of any leaks that may occur from the duct, and to avoid damage to the insulating sleeve.

Preferably, the said longitudinal elements are applied to the periphery of said draping mandrel along two generator lines thereof. The said longitudinal elements applied to said mandrel can then be secured by welding.

In a preferred embodiment, the said longitudinal elements are made in the form of rods, which may be circular in cross-section, for example. Thus, existing draping mandrels can easily be fitted by applying rods thereto. In addition, since they are circular in section, the overlapping longitudinal swellings of the margins are omega-shaped ($\Omega$), thereby guaranteeing reliable interfitting and effective sealing of the half-shells forming the sheath.

In another embodiment, the longitudinal elements may constitute integral portions of said mandrel, being manufactured simultaneously therewith.

Advantageously, foils are disposed between the overlapping corresponding margins of said sheets that form said swellings. This avoids any danger of the corresponding margins of the sheets adhering to each other during polymerization.

It is also preferable to apply the first and second sheets over the outside surface of said mandrel by means of suction under drive from a fluid source connected to an axial passage provided in said mandrel and opening out into the outside surface thereof via radial passages.

To ensure that the semicylindrical half-shells interfit effectively, the said longitudinal margins of the sheets that respectively overlie said longitudinal elements are superposed over an angular arc lying at least in the range 15° to 20° C.

BRIEF DESCRIPTION OF THE DRAWINGS

An embodiment of the invention is described by way of example with reference to the accompanying drawings, in which:

FIG. 4 is a diagrammatic plan view showing one example of an air-conditioning duct made up of a rectilinear length and of a curved length, which lengths are interconnected and are surrounded by respective protective sheaths.

FIG. 5 is a section through said duct on line V—V of FIG. 4.

DETAILED DESCRIPTION

The method is intended for manufacturing a protective sheath 2 made out of laminated material based on fibers impregnated with resin which is placed around a cylindrical draping mandrel 1, and which subsequently surrounds a fluid duct or the like. As described above, the outside geometrical shape of the draping mandrel 1 corresponds to that of the duct to be covered, making allowance for an insulating sleeve should one be put into place previously around said duct.

Figure 1:
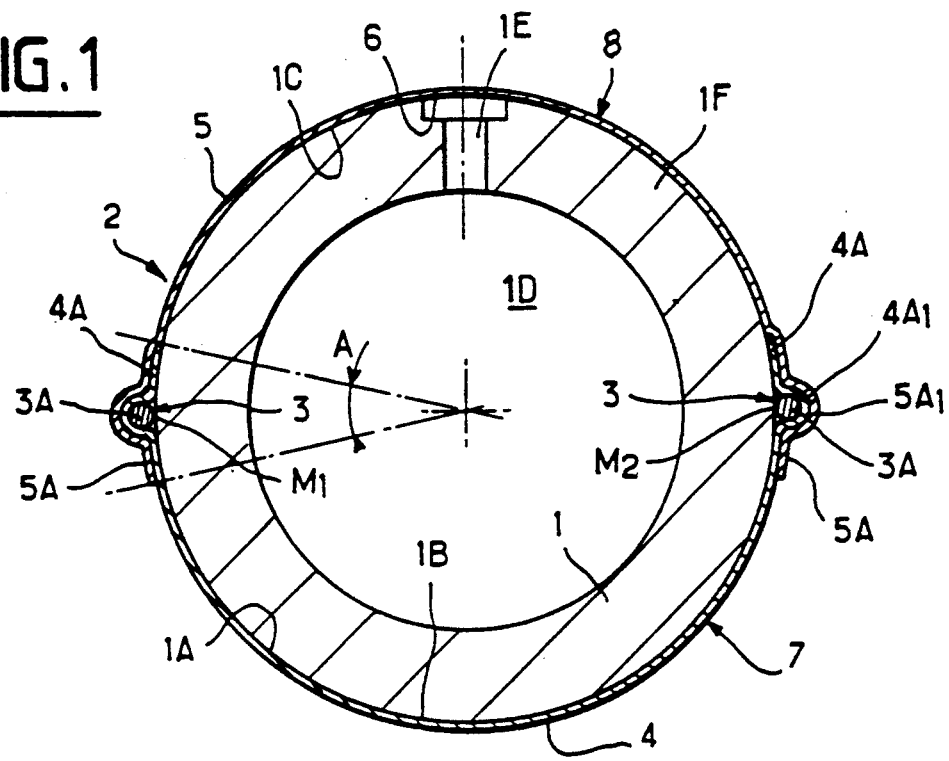
FIG. 1 is a cross-section through a protective sheath obtained by means of a draping mandrel and by implementing the method of the invention.

According to the invention, and as shown in FIG. 1, the method consists advantageously in initially providing two longitudinal elements 3 on the cylindrical draping mandrel 1, which elements project from the outside surface 1A of the mandrel and are disposed substantially along two diametrically opposite generator lines $M_1$ and $M_2$ of said outside surface. Thus, these two longitudinal elements 3 divide the outside surface of the draping mandrel into two semicylindrical portions 1B and 1C that are identical. In a preferred embodiment, these two longitudinal elements 3 are constituted by circular section rods 3A which are secured to said mandrel by welding or by any other suitable fixing means along its generator lines $M_1$ and $M_2$. The mandrel is hollow and consequently it has an axial passage 1D. The section of the draping mandrel 1 as shown in FIG. 1 is in the form of a ring, but it could have any other shape and its shape could vary lengthwise, as a function of the outside geometrical shape of the duct to be covered.

The method of the invention then consists in placing first and second flexible laminated material sheets 4 and 5 around the mandrel 1 fitted with its two diametrically opposite longitudinal rods 3A.

Thus, the first sheet 4 is placed on the semicylindrical portion 1B of the mandrel 1 in such a way that its longitudinal margins 4A overlie both rods 3A. Thereafter, the second sheet 5 is placed on the other semicylindrical portion 1C of said mandrel 1 in such a manner that its longitudinal margins 5A overlie the margins 4A of the first sheet and the longitudinal rods 3A. To do this, the widths of these sheets are determined initially so that their longitudinal margins completely overlie the rods and project respectively beyond them. It can be seen in FIG. 1 that the corresponding margins 4A and 5A of the sheets overlap each other over an angular arc A of about 15° C. to 20°. Thereafter, the sheets of flexible laminated material 4 and 5 once put into place in this way are pressed against the semicylindrical portions 1B and 1C that define the outside surface 1A of said mandrel. To do this, suction is established in the axial passage 1D of the mandrel by means of a fluid source (not shown in FIG. 1, but known per se), thereby enabling the sheets 4 and 5 to be pressed firmly against the outside surface of said mandrel by virtue of radial passages 1E formed through the wall 1F of the mandrel and connecting the axial passage 1D to the outside surface 1A of the mandrel. Thus, as shown in FIG. 1, porous rigid plates 6 are provided around the passages 1E and against the outside surface of the mandrel to prevent the sheet of laminated material (in this case the sheet 5) being locally sucked in and deformed.

Thereafter the sheets 4 and 5 are hardened by polymerization while they are pressed against the mandrel 1. After the sheets have hardened and after the fluid source has been stopped, these sheets 4 and 5 define two semicylindrical half-shells 7 and 8 respectively which are engaged one in the other via their respective longitudinal margins 4A and 5A which overlap and which fit around the outside shape of the longitudinal rods 3A secured to the mandrel. Because of these rods, the outer longitudinal margins 4A and 5A of said half-shells 7 and 8 form matching outer longitudinal swellings $4A_1$ and $5A_1$ over the rods, each having an omega ($\Omega$) profile, as can be seen in FIGS. 1 and 2.

Thereafter the two half-shells 7 and 8 are removed from the mandrel, which half-shells now form a protective sheath 1. To do this, in this embodiment, the longitudinal margins 5A of semicylindrical half-shell 8 are lifted off the longitudinal margins 4A of the other semicylindrical half-shell 7 so that the swellings $5A_1$ in the margins 5A are disengaged from the swellings $4A_1$ in the margins 4A. Thereafter, in analogous manner, the half-shell 7 is removed from the draping mandrel 1. Naturally, the distance through which the half-shell 8 needs to be opened out to remove it from the half-shell 7, and then the distance the half-shell 7 needs to be opened out to remove it from the mandrel 1 are such as to remain within the intrinsic elastic range of the material constituting each of the half-shells 7 and 8, i.e. the sheets 4 and 5.

Because of this ease of disassembly and assembly by disengaging and engaging said half-shells, as obtained by the method of the invention, it is possible to make protective sheaths of complex geometrical shapes. In addition, the sheaths may advantageously be made of laminated material including carbon fibers, thereby making it possible to increase the rigidity of the resulting sheath without encountering the problems mentioned above.

Figure 2:
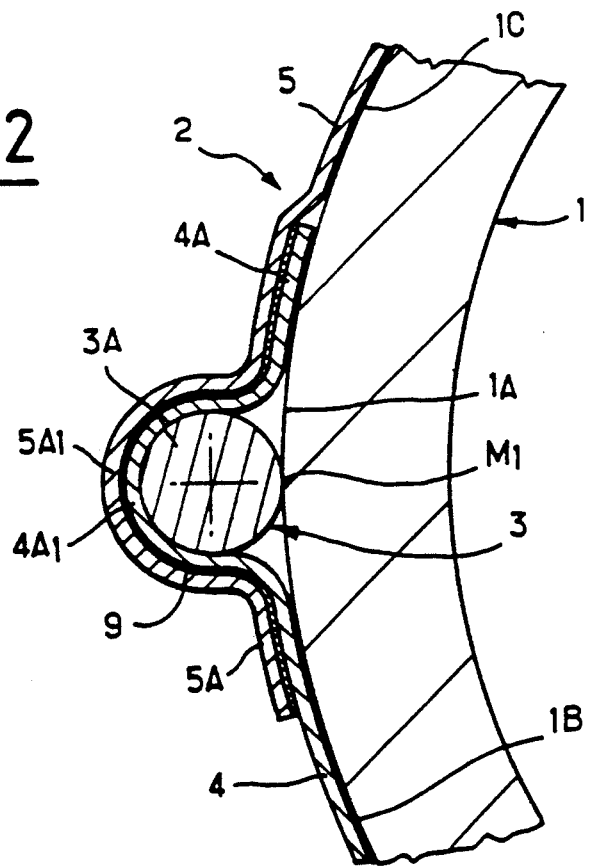
FIG. 2 is on a larger scale showing how two half-shells of the sheath interfit.

Furthermore, as shown in FIG. 2, it is possible to install a foil 9 made of a thin metal strip between the overlapping margins 4A and 5A of said sheets. This disposition of foils 9 between the overlapping margins of the sheets prevents any risk of said sheets sticking together at this point during the hardening operation.

Although the longitudinal elements 3 are applied to the draping mandrel 1 in the example described, thereby making it possible to fit existing mandrels with said rods at low cost, the elements could alternatively be integrally formed with the mandrel during manufacture thereof.

Figure 3A:
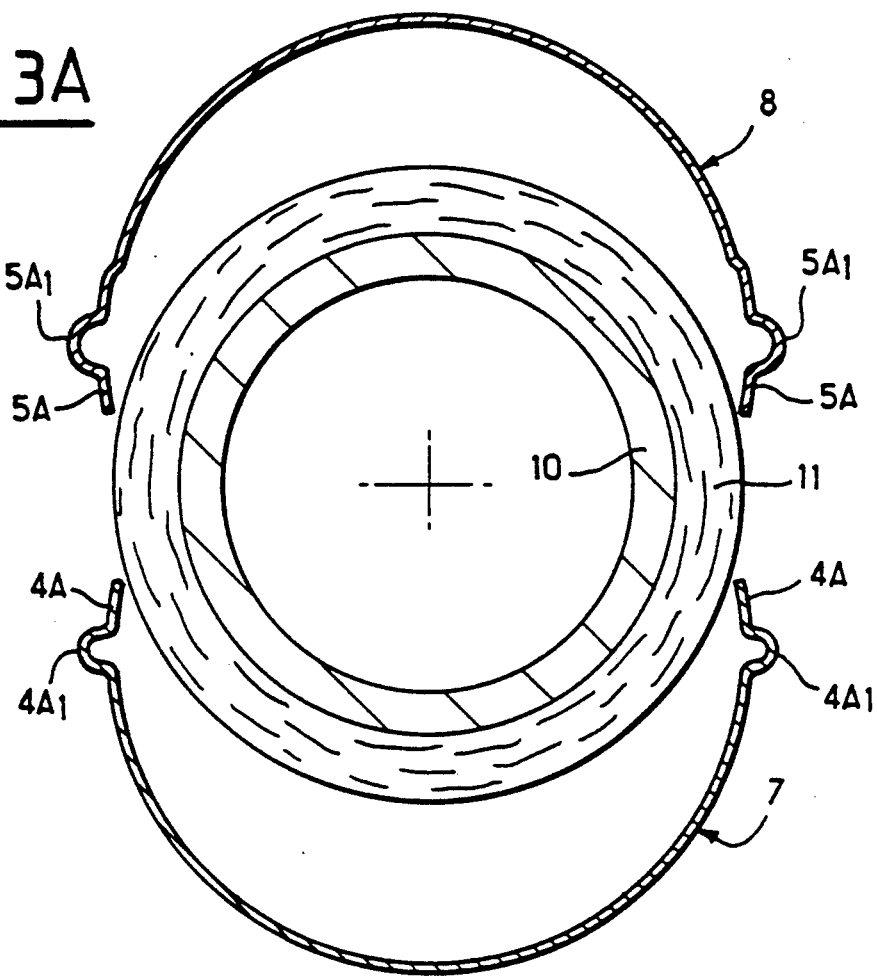
FIGS. 3A and 3B are diagrammatic cross-section views showing the installation of the resulting protective sheath around an air-conditioning fluid duct which is surrounded, in this case, by an insulating sleeve.
Figure 3B:
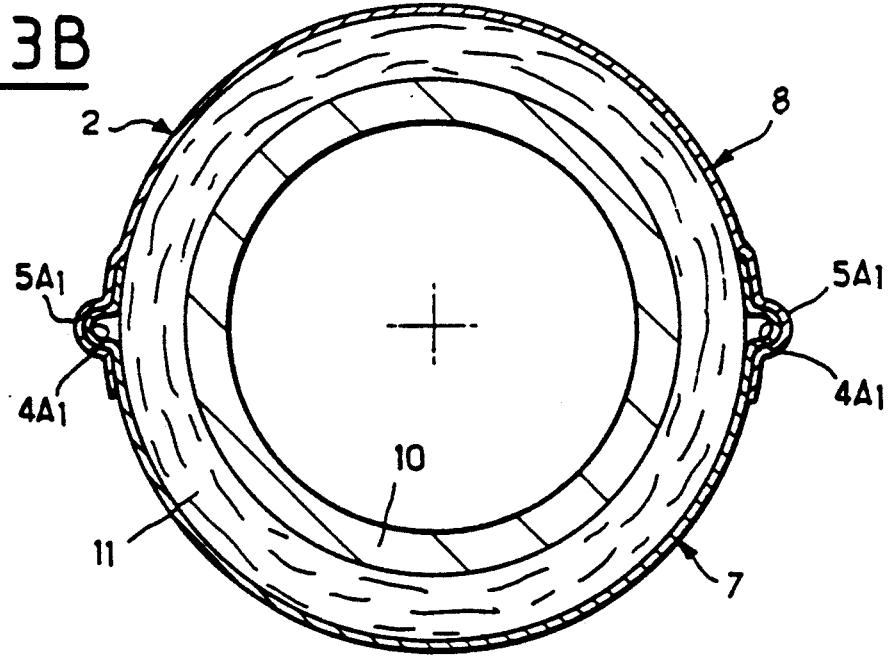

As shown in FIGS. 3A and 3B, the protective sheaths 2 obtained by implementing the method of the invention may be intended, for example, for fitting to a high temperature air-conditioning ducts as used, in particular, in aircraft, one of which is shown diagrammatically in section in these figures under numerical reference 10. The protective sheath 2 is intended to protect the duct 10 from external shocks and to prevent any air flowing along the duct escaping to the outside in the event of a leak appearing in the duct. Thus, the protective sheaths constitute a protective screen. In addition, an insulating sleeve 11 is generally provided made of glass wool and disposed around the duct 10.

FIG. 3A shows how the protective sheath is installed by disposing the two semicylindrical half-shells 7 and 8 on opposite sides of said insulating sleeve 11 that surrounds the duct 10, and then in bringing the longitudinal margins 4A and 5A towards one another in pairs until the corresponding swellings $4A_1$ and $5A_1$ engage in one another. It can thus be seen that assembling the shells by interfitting margins does not damage the insulating sleeve of glass wool 11 and in addition imparts good sealing to the resulting protective sheath 1 because of the omega-section swellings, as can be seen in FIG. 3B.

FIGS. 4 and 5 show a portion of an air-conditioning duct 10 comprising a rectilinear length 10A and a curved length 10B, which lengths are suitably interconnected at 10C. Protective sheaths 2 are disposed about said lengths.

To detect any air leaks through the duct, which may be at high temperature and pressure, appropriate sensors 12 for detecting the main physical parameters (pressure, temperature, etc.) are applied to the protective sheaths 2. Since the sealing between two half-shells of the sheaths is effective, a leak is rapidly detected by the sensors 12. In addition, the sheaths 2 then withstand a leak effectively since they are made of carbon fibers, thereby making it possible to wait before taking action on the air circuit at a later date.

I claim:

1. A method of manufacturing a protective sheath made of laminated material based on fibers impregnated with resin comprising the steps of:

providing a cylindrical draping mandrel, providing at least two longitudinal elements on said mandrel to project from the periphery thereof, which elements are disposed substantially along diametrically opposite generator lines of the mandrel, dividing said mandrel into two longitudinal semicylindrical portions;

placing a first sheet of flexible laminated material on one of said semicylindrical portions of the mandrel, with the longitudinal margins of the sheet overlying said longitudinal elements;

placing a second sheet of flexible laminated material on the other semicylindrical portion, with the longitudinal margins thereof overlying the longitudinal margins of the first sheet and said projecting longitudinal elements;

pressing the first and second sheets against the outside surfaces of the semicylindrical portions by means of a pressure difference;

hardening both sheets thereby defining two semicylindrical half-shells which are interfitted in each other along their respective longitudinal margins, which margins fit over the profile of said longitudinal elements and form external longitudinal swellings; and moving the two half-shells from said mandrel.

2. A method according to claim 1, wherein said longitudinal elements are applied to the periphery of said draping mandrel along the two generator lines.

3. A method according to claim 2, wherein said longitudinal elements are secured to the mandrel by welding.

4. A method according to claim 1, wherein said longitudinal elements are made in the form of rods.

5. A method according to claim 4, wherein the rods are circular in cross-section.

6. A method according to claim 1, wherein the longitudinal elements form integral portions of said mandrel.

7. A method according to claim 1, further comprising the step of disposing between the corresponding margins that overlap and that form said longitudinal swellings of said sheets.

8. A method according to claim 1, wherein the step of pressing the first and second sheets against the outside surface of said mandrel comprises applying suction under drive from a fluid source connected to an axial passage provided in said mandrel and opening out via radial passages into the outside surface of said mandrel.

9. A method according to claim 1, wherein said longitudinal margins of the sheets overlying said longitudinal elements overlap one another in pairs over respective angular arcs lying at least in the range 15° to 20°.

* * * * *

UNITED STATES PATENT AND TRADEMARK OFFICE
CERTIFICATE OF CORRECTION

PATENT NO.   : 5,262,120
DATED        : November 16, 1993
INVENTOR(S)  : Joel Bretagne It is certified that error appears in the above-indentified patent and that said Letters Patent is hereby corrected as shown below:

Column 6, line 61, "moving" should be --removing--.

Column 7, line 6, after "disposing" insert --foils--.

Signed and Sealed this

Nineteenth Day of April, 1994

Attest:

BRUCE LEHMAN

*Attesting Officer*       *Commissioner of Patents and Trademarks*